United States Patent
Kim et al.

(10) Patent No.: US 10,272,903 B2
(45) Date of Patent: Apr. 30, 2019

(54) APPARATUS AND METHOD FOR ACTIVE VIBRATION CONTROL OF HYBRID VEHICLE

(71) Applicants: Hyundai Motor Company, Seoul (KR); Kia Motors Corporation, Seoul (KR)

(72) Inventors: Sung Jae Kim, Suwon-si (KR); Jeong Soo Eo, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/962,519

(22) Filed: Apr. 25, 2018

(65) Prior Publication Data

US 2018/0244259 A1 Aug. 30, 2018

Related U.S. Application Data (62) Division of application No. 15/286,092, filed on Oct. 5, 2016, now Pat. No. 9,981,652.

(30) Foreign Application Priority Data

Dec. 11, 2015 (KR) .......................... 10-2015-0176940

(51) Int. Cl.
*B60L 11/00* (2006.01)
*B60L 9/00* (2019.01)
(Continued)

(52) U.S. Cl.
CPC .............. *B60W 20/15* (2016.01); *B60K 6/48* (2013.01); *B60K 6/485* (2013.01); *B60W 10/06* (2013.01);
(Continued)

(58) Field of Classification Search
CPC ...... B60W 10/06; B60W 10/08; B60W 20/15; B60W 2510/06; B60W 2510/0638;
(Continued)

(56) References Cited

U.S. PATENT DOCUMENTS 6,102,144 A * 8/2000 Lutz .................... B60K 6/48
  180/65.25
6,246,952 B1 * 6/2001 Honda .................... F02P 5/152
  123/406.38

(Continued)

FOREIGN PATENT DOCUMENTS

| JP | 2003-202870 A | 7/2003 |
| JP | 2008-167612 | 7/2008 |
| KR | 10-2010-0064603 | 6/2010 |

*Primary Examiner* — Harry Y Oh
(74) *Attorney, Agent, or Firm* — Brinks Gilson & Lione (57) ABSTRACT

The present disclosure relates to an apparatus and a method for active vibration control of a hybrid electric vehicle. Exemplary forms provide a method for active vibration control of a hybrid electric vehicle that may include detecting an engine speed or a motor speed; selecting a reference angle signal based on position information of a motor or an engine; establishing a period of fast Fourier transform (FFT) and performing FFT of the engine speed or the motor speed corresponding to the period of the FFT from the reference angle signal; establishing a reference spectrum according to an engine speed and an engine load; extracting a vibration components to be removed based on information of the reference spectrum; summing vibration components to be removed according to the frequencies and performing inverse FFT; determining an amplitude ratio according to the engine speed and the engine load; determining an adjustable rate such that a speed change amount of the engine is increased as an anti-phase torque is increased; and perform- (Continued)

ing active vibration control of each frequency based on the information of the basic amplitude ratio, the adjustable rate, and the engine torque.

6 Claims, 11 Drawing Sheets

(51) Int. Cl.

| | | |
|---|---|---|
| G05D 1/00 | (2006.01) | |
| G05D 3/00 | (2006.01) | |
| G06F 7/00 | (2006.01) | |
| G06F 17/00 | (2019.01) | |
| B60W 20/15 | (2016.01) | |
| B60W 10/06 | (2006.01) | |
| B60W 10/08 | (2006.01) | |
| B60W 30/02 | (2012.01) | |
| B60K 6/48 | (2007.10) | |
| B60K 6/485 | (2007.10) | |
| B60W 30/20 | (2006.01) | |
| B60W 50/00 | (2006.01) | |

(52) U.S. Cl.
CPC .......... *B60W 10/08* (2013.01); *B60W 30/025* (2013.01); *B60W 30/20* (2013.01); *B60W 2030/206* (2013.01); *B60W 2050/0057* (2013.01); *B60W 2510/06* (2013.01); *B60W 2510/0638* (2013.01); *B60W 2510/0657* (2013.01); *B60W 2510/081* (2013.01); *B60W 2710/0666* (2013.01); *B60W 2710/083* (2013.01); *B60Y 2200/92* (2013.01); *G05B 2219/34048* (2013.01); *Y02T 10/6221* (2013.01); *Y02T 10/6226* (2013.01); *Y02T 10/6286* (2013.01)

(58) Field of Classification Search
CPC ... B60W 2510/0657; B60W 2510/081; B60W 2710/0666; B60W 2710/083; B60W 30/025
USPC .......................................................... 701/22
See application file for complete search history.

(56) References Cited

U.S. PATENT DOCUMENTS

| | | | | |
|---|---|---|---|---|
| 7,633,257 | B2* | 12/2009 | Sakamoto | B60W 30/20 318/611 |
| 9,533,672 | B2* | 1/2017 | Christ | B60W 10/08 |
| 9,758,157 | B2* | 9/2017 | Eo | B60W 20/17 |
| 2009/0251096 | A1* | 10/2009 | Schulz | H02P 6/10 318/801 |
| 2009/0267555 | A1* | 10/2009 | Schulz | H02P 29/50 318/432 |
| 2012/0078456 | A1* | 3/2012 | Hakumura | B60L 3/003 701/22 |
| 2014/0100733 | A1 | 4/2014 | Christ | |
| 2017/0166186 | A1* | 6/2017 | Kim | B60W 20/15 |
| 2017/0166187 | A1* | 6/2017 | Eo | B60K 6/485 |
| 2017/0166188 | A1* | 6/2017 | Kim | B60W 20/17 |
| 2017/0166189 | A1* | 6/2017 | Eo | B60W 20/17 |
| 2017/0166213 | A1* | 6/2017 | Kim | B60W 30/20 |

* cited by examiner

APPARATUS AND METHOD FOR ACTIVE VIBRATION CONTROL OF HYBRID VEHICLE

CROSS-REFERENCE TO RELATED APPLICATION(S)

The present application is a divisional of U.S. patent application Ser. No. 15/286,092, filed on Oct. 5, 2016, which claims priority to Korean Patent Application No. 10-2015-0176940, filed in the Korean Intellectual Property Office on Dec. 11, 2015, the entirety of all of which are hereby incorporated by reference herein.

BACKGROUND

(a) Field of the Disclosure

The present disclosure relates to an apparatus and a method for active vibration control of a hybrid electric vehicle. More particularly, the present disclosure relates to an apparatus and a method for active vibration control of a hybrid electric vehicle that controls unsteady vibration by analyzing a frequency spectrum through fast Fourier transform (FFT).

(b) Description of the Related Art

A hybrid vehicle is a vehicle using two or more different kinds of power sources, and is generally a vehicle that is driven by an engine that obtains a driving torque by burning fuel and a motor that obtains a driving torque with battery power.

Hybrid electric vehicles can be provided with optimum output torque, depending on how the engine and the motor are operated while the vehicles are driven by the two power sources, that is, the engine and the motor.

Hybrid electric vehicles may form various structures using the engine and the motor as power sources. Hybrid electric vehicles may be classified as a TMED (Transmission Mounted Electric Device) type, in which the engine and the motor are connected by an engine clutch and the motor is connected to the transmission, or a FMED (Flywheel Mounted Electric Device) type, in which the motor is directly connected to a crankshaft of the engine and connected to the transmission through a flywheel.

From among these, since the FMED type of the hybrid electric vehicle is very noisy and has severe vibration, vibration reduction thereof is being studied. A method of frequency analysis which extracts the vibration component is normally used for this.

An analog method using a band pass filter has been used in a conventional frequency analysis, wherein the analog method of analysis determines whether or not a frequency is abnormal based on an amplitude of each expected point of a frequency band.

However, distinguishing between the vibration component of the engine and the vibration of the noise component is difficult, and unnecessary over-control of the vibration negatively affects aspects of control efficiency and energy management. Further, because it is only possible to create and synchronize a reference signal with respect to a specific frequency in the conventional frequency analysis, comprehensive and active control of other frequencies which may be additionally generated is not performed.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for active vibration control of a hybrid electric vehicle, having advantages of elaborately controlling an abnormal vibration component through an entire frequency spectrum analysis using FFT (fast Fourier transform) and reflecting a change of a surrounding frequency component in real time by feedback.

An exemplary form of the present disclosure provides a method for active vibration control of a hybrid electric vehicle that may include detecting an engine speed or a motor speed; selecting a reference angle signal based on position information of a motor or an engine; establishing a period of fast Fourier transform (FFT) and performing FFT of the engine speed or the motor speed corresponding to the period of the FFT from the reference angle signal; establishing a reference spectrum according to an engine speed and an engine load; extracting vibration components to be removed based on information of the reference spectrum; summing vibration components to be removed according to the frequencies and performing inverse FFT; determining an amplitude ratio according to the engine speed and the engine load; determining an adjustable rate such that a speed change amount of the engine is increased as an anti-phase torque is increased; and performing active vibration control of each frequency based on the information of the basic amplitude ratio, the adjustable rate, and the engine torque.

The reference angle signal may be established by dividing by a number (m) of resolver poles based on information of the position of the motor or by selecting the reference angle between a top dead center (TDC) of a number one cylinder and a bottom dead center (BDC) of a number four cylinder based on information of the position of the engine.

The FFT period may be set in consideration of a cylinder and a stroke of the engine.

The analysis of the FFT signal may calculate a magnitude and phase information of each frequency.

The frequency component that the FFT signal is greater than the reference spectrum may be selected as the vibration component to be removed.

The vibration component to be removed may be removed by outputting the motor torque corresponding to an inverse value of a value by multiplying the reference signal created by inverse FFT, the engine torque, the basic amplitude ratio and the adjustable rate.

Another exemplary form of the present disclosure provides a control apparatus for active vibration control of a hybrid electric vehicle including an engine and a motor as a power source that may include a position sensor configured to detect position information of the engine or the motor; a controller configured to select a reference angle signal on the basis of a signal from the position sensor, to perform fast Fourier transform (FFT) of engine speed or motor speed, to extract a vibration component to be removed through the FFT analysis, and to perform active vibration control of each frequency by performing inverse FFT; the controller may be configured to perform active vibration control of each frequency by reflecting a reference signal created by the inverse FFT, a amplitude ratio, a predetermined adjustable rate such that the anti-phase torque is increased with the change of the engine speed, and an engine torque.

The controller may be configured to establish a reference spectrum according to an engine speed and an engine load, and to extract the vibration component to be removed by comparing the reference spectrum with the FFT signal.

The controller may be configured to sum the vibration components to be removed according to frequencies, and to generate a reference signal by performing inverse FFT.

The controller may be configured to determine an amplitude ratio according to an engine speed and an engine load, and to perform active vibration control of each frequency by reflecting the amplitude ratio and an engine torque.

The controller may be configured to remove the vibration component by outputting the motor torque corresponding to an inverse value of a value by multiplying the reference signal created by inverse FFT, the engine torque and the basic amplitude ratio.

The controller may be configured to establish the reference angle by dividing by a number (m) of resolver poles based on information of the position of the motor or to establish the reference angle between a top dead center (TDC) of a number one cylinder and a bottom dead center (BDC) of a number four cylinder based on information of the position of the engine.

The controller may be configured to establish an FFT period in consideration of a cylinder and stroke of the engine, and analyzes the FFT signal by a calculated magnitude and phase information of each frequency.

As described above, in exemplary forms of the present disclosure, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amounts of vibration and a frequency which is an object of the vibration control may be controlled individually, so it is possible to prevent inefficiency which is from the control when the vibration is over-removed and the fuel consumption may be improved as the motor torque is increased when the engine is accelerated. Thus, precise and efficient active control may be performed through the feedback control in real time.

DETAILED DESCRIPTION

In the following detailed description, only certain exemplary forms of the present disclosure have been shown and described, simply by way of illustration. As those skilled in the art would realize, the described forms may be modified in various different ways, all without departing from the spirit or scope of the present invention.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

An exemplary form of the present disclosure will hereinafter be described in detail with reference to the accompanying drawings.

Figure 1:
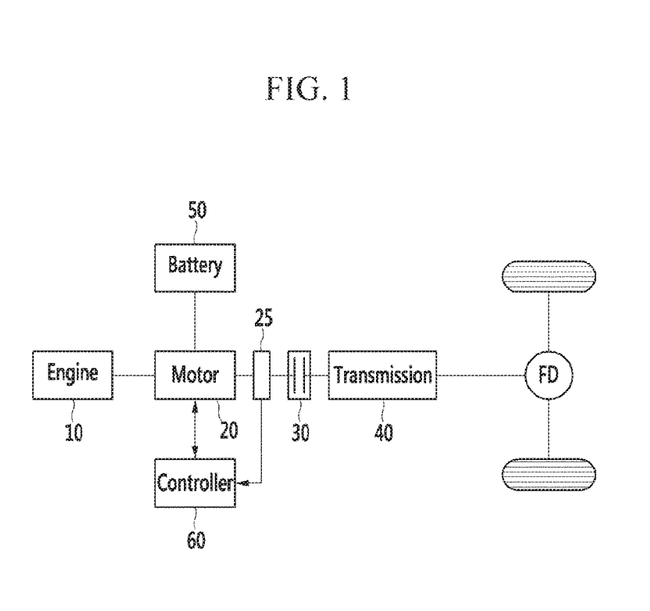
FIG. 1 is a schematic block diagram of an apparatus for active vibration control of a hybrid electric vehicle.

FIG. 1 is a schematic block diagram of an apparatus for active vibration control of a hybrid electric vehicle.

As shown in FIG. 1, an apparatus for active vibration control of a hybrid electric vehicle includes an engine 10, a motor 20, a position sensor 25, a clutch 30, a transmission 40, a battery 50, and a controller 60.

The engine 10 outputs power by combusting fuel as a power source while turned on. The engine 10 may be various disclosed engines such as a gasoline engine or a diesel engine using conventional fossil fuel. The rotation power generated from the engine 10 is transmitted to the transmission 40 side through the clutch 30.

The motor 20 is operated by a 3-phase AC voltage applied from the battery 50 through an inverter to generate torque, and operates as a power generator and supplies regenerative energy to the battery 50 in a coast-down mode.

In the exemplary form of the present disclosure, the motor 20 may be directly connected to the crankshaft of the engine 10.

The position sensor 25 detects position information of the engine 10 or the motor 20. The position information of the engine 10 or the motor 20 are transmitted to the controller 60.

That is, the position sensor 25 may include a crankshaft position sensor that detects a phase of the crankshaft or a motor position sensor that detects a position of a stator and a rotor of the motor.

The controller 60 may calculate an engine speed by differentiating the rotation angle detected by the crankshaft position sensor, and a motor speed may be calculated by differentiating the position of the stator and the rotor of the motor detected by the motor position sensor.

The position sensor 25 may be additional speed sensor (not shown) for measuring the engine speed or the motor speed.

The clutch 30 is disposed between the motor 20 connected to the crankshaft of the engine 10 and the transmission 40, and switches power delivery to the transmission 40. The clutch 30 may be applied as a hydraulic pressure type of clutch or dry-type clutch.

The transmission 40 adjusts a shift ratio according to a vehicle speed and a running condition, distributes an output torque by the shift ratio, and transfers the output torque to the driving wheel, thereby enabling the vehicle to run. The transmission 40 may be applied as an automatic transmission (AMT) or a dual clutch transmission (DCT).

The battery 50 is formed with a plurality of unit cells, and a high voltage for providing a driving voltage to the motor 20 is stored at the battery 50. The battery 50 supplies the driving voltage to the motor 20 depending on the driving mode, and is charged by the voltage generated from the motor 20 in the regenerative braking.

The controller 60 selects a reference angle signal on the basis of a signal from the position sensor, performs fast Fourier transform (FFT), extracts a vibration component to be removed the FFT analysis, and performs active vibration control of each frequency by performing inverse FFT.

That is, the controller 60 sets up a reference spectrum according to a speed and load of the engine, extracts a vibration component of each frequency by comparing the reference spectrum with the FFT signal analysis result, and generates a reference signal by performing inverse FFT after selecting and summing a removal object frequency from each frequency vibration through FFT analysis. The reference signal may mean an inverse FFT signal of the vibration components to be removed according to frequencies.

In addition, the active vibration control of each frequency is performed considering a basic amplitude ratio according to an engine speed and load, and a adjustable rate which is predetermined such that the anti-phase torque is increased with the change of the engine speed and engine torque For these purposes, the controller 60 may be implemented as at least one processor that is operated by a predetermined program, and the predetermined program may be programmed in order to perform each step of a method for active vibration control of a hybrid electric vehicle according to an exemplary form of the present disclosure.

Various forms described herein may be implemented within a recording medium that may be read by a computer or a similar device by using software, hardware, or a combination thereof, for example.

In hardware implementations, the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

In software implementations, forms such as procedures and functions described in the present forms may be implemented by separate software modules. Each of the software modules may perform one or more functions and operations described in the present disclosure. A software code may be implemented by a software application written in an appropriate program language.

Hereinafter, a method for active vibration control of the hybrid electric vehicle according to an exemplary form of the present disclosure will be described in detail with reference to FIG. 2 to FIG. 4.

Figure 2:
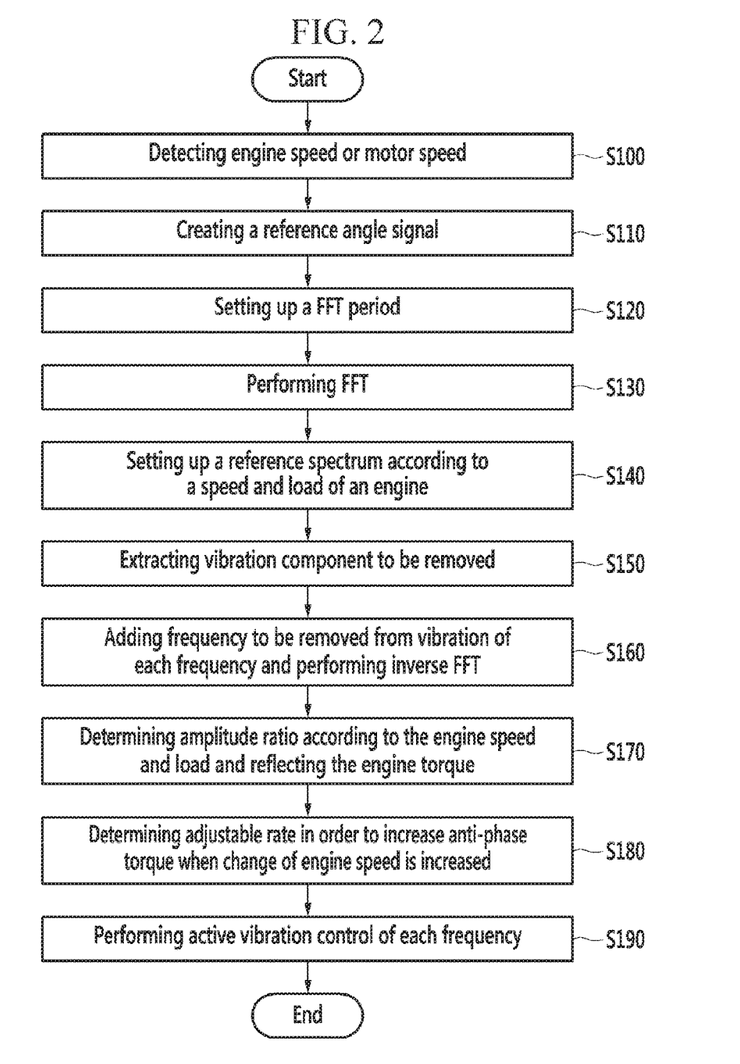
FIG. 2 is a flowchart illustrating a method for active vibration control of a hybrid electric vehicle.
Figure 3A:
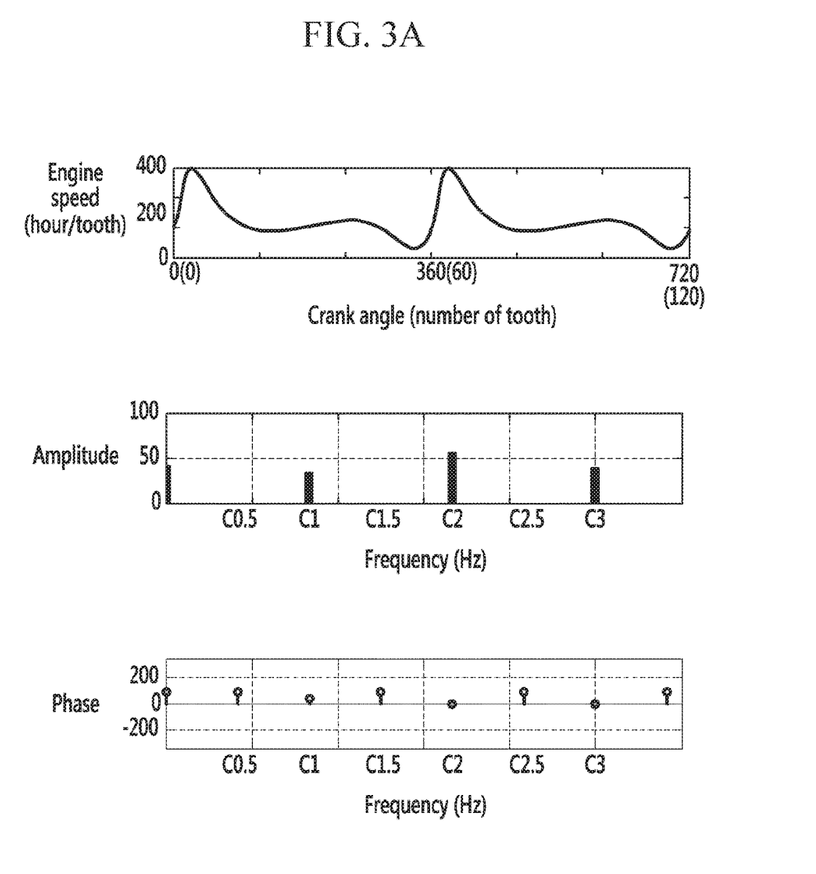
FIG. 3A is a drawing illustrating vibration reduction to which a method for active vibration control of a hybrid electric vehicle is applied in case that a change amount of an engine speed is increased.
Figure 3B:
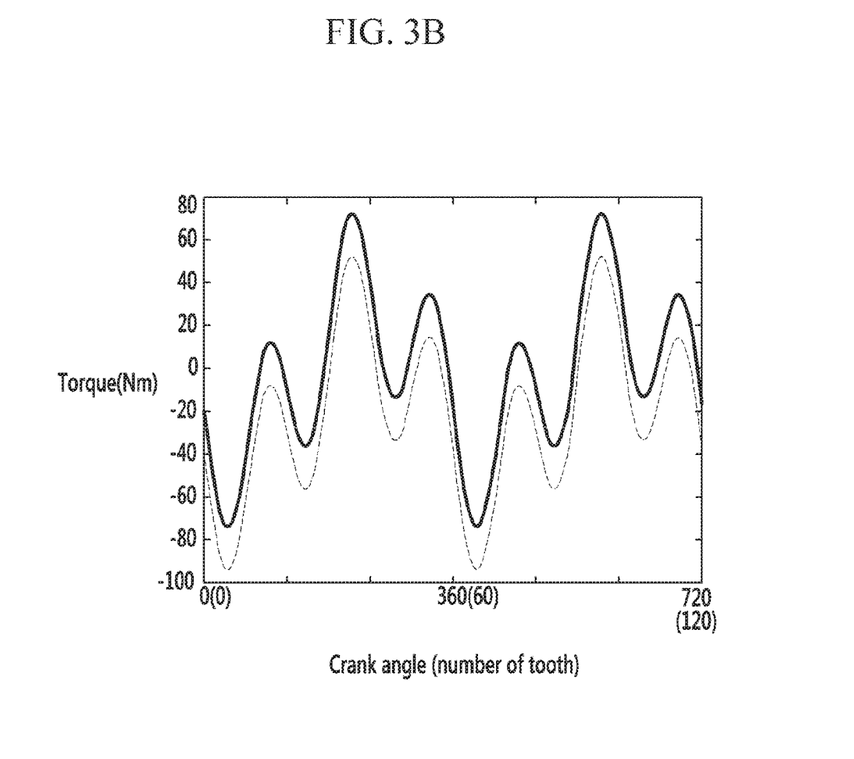
FIG. 3B is a drawing illustrating vibration reduction to which a method for active vibration control of a hybrid electric vehicle is applied in case that a change amount of an engine speed is increased.
Figure 3C:
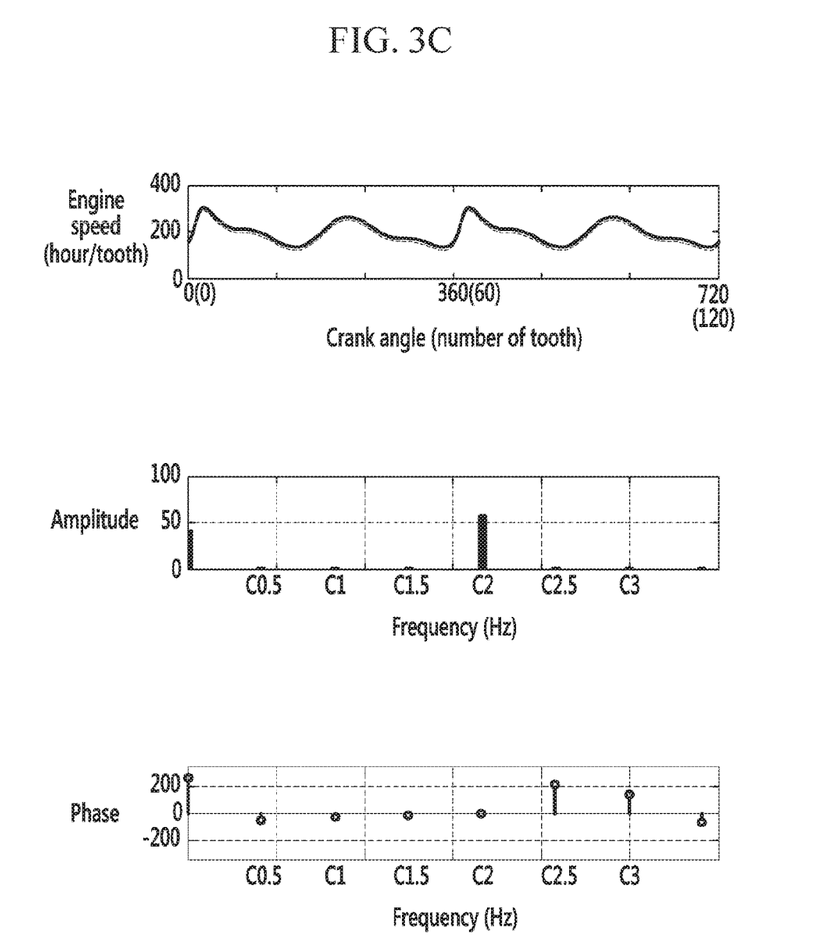
FIG. 3C is a drawing illustrating vibration reduction to which a method for active vibration control of a hybrid electric vehicle is applied in case that a change amount of an engine speed is increased.

FIG. 2 is a flowchart illustrating a method for active vibration control of a hybrid electric vehicle according to an exemplary form of the present disclosure, and FIG. 3A to FIG. 3C are drawings illustrating vibration reduction to which a method for active vibration control of a hybrid electric vehicle is applied in case that a change amount of an engine speed is increased.

Figure 4A:
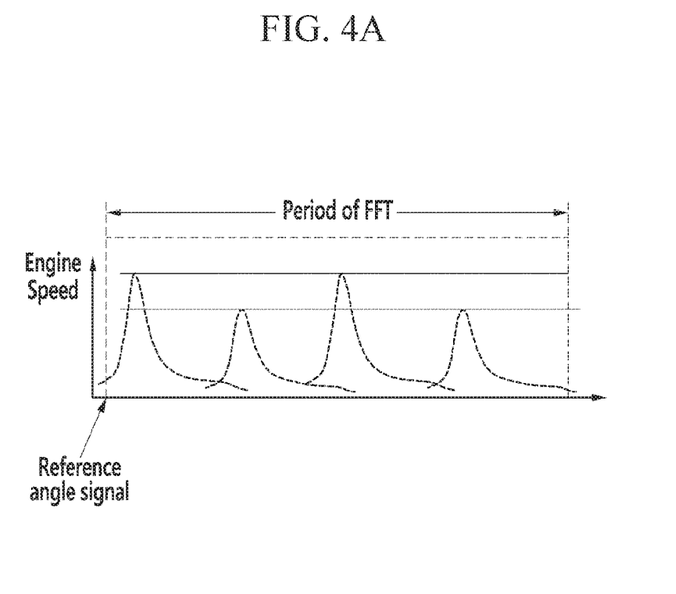
FIG. 4A is a graph for explaining a method for active vibration control of a hybrid electric vehicle.

As shown in FIG. 2, an active vibration control method of the hybrid electric vehicle is started when the position sensor 25 detects position information of the engine 10 or the motor 20 at step S100, and the controller 60 may detect engine speed or motor speed using the position information of the engine 10 or the motor 20 at step S100 (refer to FIG. 4A).

The controller 60 selects the reference angle signal based on the signal of the position sensor 25 at step S110. That is, the controller 60 selects the reference angle signal according to information of positions of the engine 10 and the motor 30 (refer to FIG. 4A).

The controller 60 may set up the reference angle signal by dividing by a number (m) of resolver poles based on information of the position of the motor 20, or may set up the reference angle signal between top dead center (TDC) of the number one cylinder and bottom dead center (BDC) of the number four cylinder based on information of the position of the engine 10.

For example, the controller 60 may select the reference angle signal based on the information of the position of the motor 20, and may create the reference angle signal by dividing 16 poles signal into eight (8). The reference angle signal means a start point for performing FFT.

After that, the controller 60 sets up a period of the FFT for performing the FFT at step S120.

The controller 60 may set up the entire period in consideration of a cylinder and stroke of the engine 10. For example, if the engine 10 has four cylinders and four strokes, the crank angle may be 720 degrees.

When the FFT period is set up in the step S120, the controller 60 performs the FFT at step S130. That is, the controller 60 performs the FFT of the engine speed or the motor speed corresponding to the period of the FFT from the reference angle signal (refer to FIG. 4B).

The controller 60 may calculate magnitude and phase information of each frequency by analyzing the FFT signal.

Figure 4B:
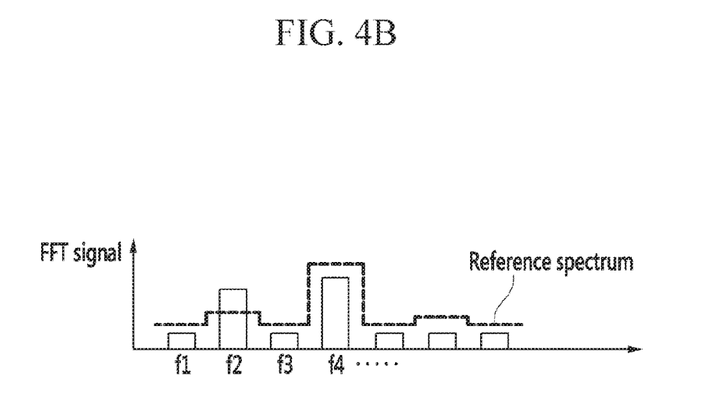
FIG. 4B is a graph for explaining a method for active vibration control of a hybrid electric vehicle.

In addition, the controller 60 sets up a reference spectrum according to the engine speed and load at step S140 (refer to FIG. 4B). That is, the controller 60 may set up a vibration reference value of each frequency according to an operating point.

When the reference spectrum is set up in the step S140, the controller 60 extracts a vibration component to be removed by comparing the FFT signal with the reference spectrum at step S150.

That is, the controller 60 may select an object requiring vibration control in a compared result value of the FFT analysis and the predetermined vibration reference value. The controller 60 may extract the frequency component that the FFT signal is greater than the reference spectrum as the vibration component to be removed. For example, referring to FIG. 4B, f2 frequency component may be selected as a frequency component to be removed.

Since the reference spectrum means normal vibration components according to the engine speed and load, the controller 60 determines the frequency component that the FFT signal is greater than the reference spectrum as abnormal vibration components to be removed.

Figure 4C:
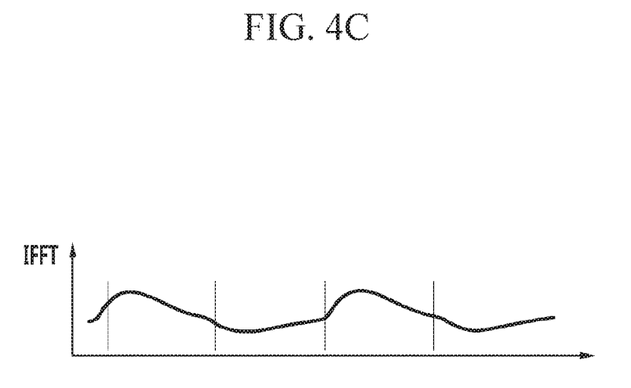
FIG. 4C is a graph for explaining a method for active vibration control of a hybrid electric vehicle.

When the vibration components to be removed is selected in the step S150, the controller 60 sums the vibration components to be removed according to frequencies, and performs inverse FFT to create a reference signal at step S160 (refer to FIG. 4C). As described above, the reference signal means inverse FFT(IFFT) signal of the vibration components to be removed.

In addition, the controller 60 determines an amplitude ratio according to an engine speed and an engine load, and reflects an engine torque at step S170.

That is, the controller 60 may input the amplitude ratio and the engine torque according to an operating point of the engine into the reference signal generated by the inverse FFT.

Herein, the amplitude ratio according to the engine speed and the engine load may be determined in advance by a predetermined map.

Figure 4D:
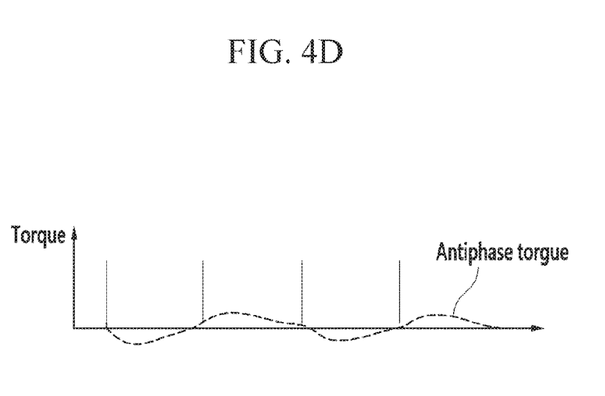
FIG. 4D is a graph for explaining a method for active vibration control of a hybrid electric vehicle.

That is, the controller 60 may remove all the positive components and negative components of the vibration components by outputting the motor torque corresponding to an inverse value of a value by multiplying the reference signal created by inverse FFT, the engine torque and the basic amplitude ratio (refer to FIG. 4D).

Since the reference signal is expressed as speed according to time, the controller 60 removes the vibration components to be removed by reflecting the engine torque and the basic amplitude ratio to the reference signal and transforming the reference signal to torque component.

Figure 4E:
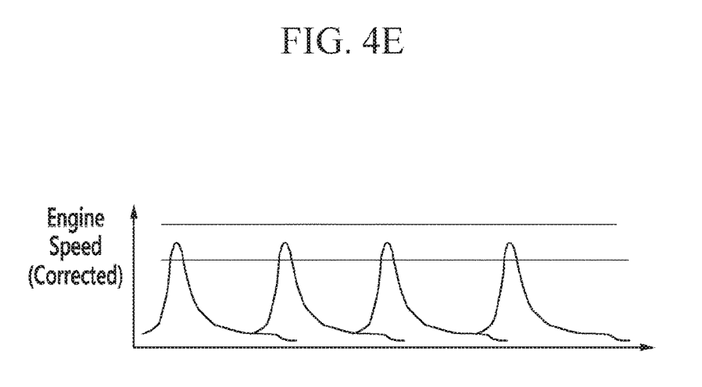
FIG. 4E is a graph for explaining a method for active vibration control of a hybrid electric vehicle.
Figure 4F:
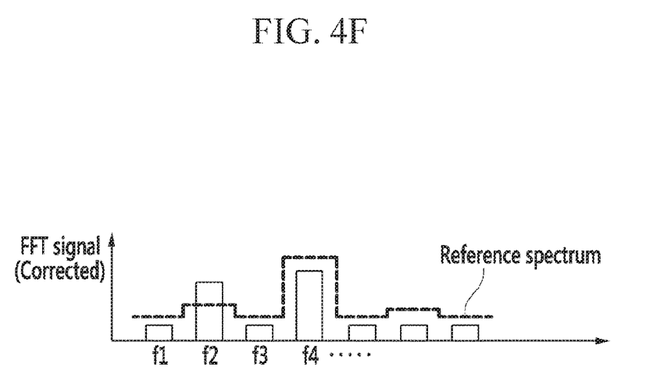
FIG. 4F is a graph for explaining a method for active vibration control of a hybrid electric vehicle.

That is, as shown in FIGS. 4E and 4F, it is possible to control the engine speed or the motor speed that the frequency components corresponding to the reference spectrum are remained.

Referring to FIG. 3A, a magnitude and phase of vibration components of each frequency calculated by performing FFT analysis is illustrated.

Referring to FIG. 3B, anti-phase torque values which overlap the component of vibration to be removed as indicated is illustrated. That is, the vibration components of each frequency and the anti-phase torque as described in the FIGS. 3A and 3B can be reflected, thereby it can be controlled such that the object to be removed may be removed and a required vibration component remains as described in the FIG. 3C.

At this time, if the engine 10 is accelerating in which the change amount of the engine speed is increasing, the predetermined adjustable rate may be determined so as to increase the anti-phase torque at step S180. Referring to 3B, anti-phase torque values which overlap the component of vibration to be removed as indicated is illustrated by a dotted line. Here, if the change of the engine speed is increased, the adjustable rate may be set up such that the anti-phase torque is offset and increased in a positive direction as indicated by a solid line.

After that, the controller 60 performs active vibration control based on information of the amplitude ratio, the adjustable rate, and the engine torque of each frequency at step S180. That is, the controller 60 may remove all the positive components and negative components of the vibration components by outputting the motor torque corresponding to an inverse value of a value by multiplying the reference signal created by inverse FFT, the engine torque, the basic amplitude ratio and the predetermined adjustable rate.

Referring to FIGS. 3A and 3B, the adjustable rate is applied to the vibration component extracted through the FFT analysis, and since the increased inverse torque when the change amount of the engine speed is increased is reflected, it is controlled such that the object to be removed is removed and a required vibration component remains, and the torque indicated by the dotted line in increased as indicated by the solid line as described in FIG. 3C.

FIG. 3C is a drawing illustrating vibration reduction to which a predetermined adjustable rate that increases a reverse phase torque as a change amount of an engine speed is increased is applied.

As described above, according to exemplary forms of the present disclosure, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, because the adjustment amount of vibration and frequency which is the object of the vibration control may be controlled individually, it is possible to prevent inefficiency which is from the control when the vibration is over-removed and the fuel consumption may be improved as the motor torque is increased when the engine is accelerated. Thus, precise and efficient active control may be performed through the feedback control in real time.

While this invention has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

What is claimed is:

1. An apparatus for active vibration control of a hybrid electric vehicle including an engine and a motor, comprising:
   a position sensor configured to detect position information of the engine or the motor; and
   a controller configured to:
      determine a reference angle signal based on the position information detected by the position sensor;
      determine a fast Fourier transform (FFT) signal by performing a FFT on signals representing an engine speed or a motor speed, wherein the FFT signal is comprised of a plurality of frequency components;
      extract a vibration component from the FFT signal; and perform active vibration control for each frequency component of the FFT signal by performing an inverse FFT on the FFT signal;

wherein the controller is configured to perform active vibration control for each frequency component of the FFT signal by controlling the engine speed or controlling the motor speed based on a value calculated from the inverse FFT, a basic amplitude ratio, a predetermined adjustable rate, and an engine torque.

2. The apparatus of claim 1, wherein the controller is configured to establish a reference spectrum according to the engine speed and an engine load, and to extract the vibration component to be removed by comparing the reference spectrum with the FFT signal.

3. The apparatus of claim 2, wherein the controller is configured to sum the vibration components to be removed according to frequencies, and to generate a reference signal by performing inverse FFT.

4. The apparatus of claim 3, wherein the controller is configured to determine the basic amplitude ratio according to the engine speed and the engine load, and to perform active vibration control of each frequency component based on a value calculated from the basic amplitude ratio and an engine torque.

5. The apparatus of claim 4, wherein the controller is configured to remove the vibration component by outputting a motor torque corresponding to a negative value of a value by multiplying the reference signal, the engine torque and the basic amplitude ratio.

6. The apparatus of claim 1, wherein the controller is configured to establish an FFT period in consideration of a cylinder and stroke of the engine, and to analyze the FFT signal by a calculated magnitude and phase information of each frequency.

* * * * *